United States Patent [19]
Reinhold

[11] Patent Number: 5,941,007
[45] Date of Patent: Aug. 24, 1999

[54] FEATHER FOLDING DEVICE AND METHOD

[76] Inventor: Ronald W. Reinhold, 4446 Westridge Dr., Williamsburg, Mich. 49690

[21] Appl. No.: 08/889,340

[22] Filed: Jul. 8, 1997

Related U.S. Application Data

[60] Provisional application No. 60/021,289, Jul. 8, 1996.

[51] Int. Cl.$^6$ ............... A01K 97/00; B25B 1/00
[52] U.S. Cl. ............ 43/1; 493/405; 269/254 R; 24/563; 43/42.53
[58] Field of Search ................... 43/42.53, 1, 4; 493/405; 270/45; 269/254 R; 24/563

[56] References Cited

U.S. PATENT DOCUMENTS

| | | |
|---|---|---|
| 192,102 | 6/1877 | Watriss . |
| 709,608 | 9/1902 | Roberts ........................... 24/563 |
| 1,229,312 | 6/1917 | Newhouse ...................... 493/405 |
| 1,245,936 | 11/1917 | Lovland ........................... 24/563 |
| 1,286,487 | 12/1918 | Allen . |
| 1,339,155 | 5/1920 | Beckwith . |
| 1,621,008 | 3/1927 | Fricker ........................... 24/563 |
| 2,847,789 | 8/1958 | Parkman ........................... 43/1 |
| 3,917,498 | 11/1975 | O'Shima ........................ 156/204 |
| 4,050,176 | 9/1977 | Asper ............................... 43/1 |
| 4,149,334 | 4/1979 | Rogers ......................... 43/42.25 |
| 5,556,366 | 9/1996 | Studebaker .................... 493/405 |

*Primary Examiner*—Kurt Rowan
*Attorney, Agent, or Firm*—Douglas S. Bishop

[57] ABSTRACT

A device and method for folding a hackle feather for fly tying purposes. The invention is designed to facilitate folding of the barbs of a feather in a uniform direction from the quill so that the feather may be used for fabricating artificial flies for fishing. The invention provides for a pair of flexible resilient members with pliant corresponding concave faces. One member is slightly larger than the other. The resilient members are held together at their base and the concavity of each member forces them together at their extended ends. The smaller of the two resilient members has a tapered edge which forms a notch between the outward end portions of the members. The feather to be folded is maneuvered into the notch, and inserted between the pliant faces of the two members. The concave faces then are pressed together, folding the feather.

12 Claims, 4 Drawing Sheets

FEATHER FOLDING DEVICE AND METHOD

PROVISIONAL APPLICATION

Applicant filed a provisional application 60/021,289 on Jul. 8, 1996 and claims priority.

FIELD OF THE INVENTION

This invention relates to the field of fishing, and the tying of artificial flies for fishing purposes and, more particularly, the folding of hackle feathers for use in the fly-tying process.

BACKGROUND OF THE INVENTION

Folding hackles, or feathers, sometimes more completely described as hackle feathers, particularly for use in making fishing flies, has been accomplished for more than one hundred (100) years on a strictly manual basis. It has been traditionally a troublesome, frustrating task. The only proven method to date has been the utilization of human hands and direct digital manipulation of the feather or hackle. The known prior art provides no other device to accomplish this task. Fly tying, as the fashioning or construction of artificial fishing flies is commonly known, consists of utilizing natural and synthetic materials which are variously treated, arranged and fastened to a fishing hook. Segments and/or components of furs, feathers and synthetic textile products are prevalent choices for materials. The fishing flies so fashioned are used as an attractor/bait/lure for enticing fish to strike and bite them.

Most fishing flies are individually fashioned to imitate some form of small terrestrial or aquatic life, most often insects, minnows or crustations. The materials which are fastened to the fishing hook are so attached in a specific manner, to constitute a particular "pattern." As an example, a fly tied to imitate a grasshopper would be known as a "hopper" or "grasshopper" pattern, whereas one tied to represent a dead mayfly drifting on a current is known as a "spinner" pattern, and so forth. Thousands of patterns exist and more are regularly developed by fly tiers.

A great many fly patterns require a feather that is folded in a certain manner. A feather consists of two basic components—the quill, which is the central component bisecting the length of the feather, and the barbs, which are filamentous protrusions closely spaced along the length of both sides of the quill. On a folded feather, which is the end result of the present invention, barbs from one side of the quill are folded around the quill in such a manner that they are brought into proximity with barbs on the other side of the quill. Ideally, a folded feather would appear as though all the barbs on one side of the quill are missing and the barbs on the other side of the quill are doubled in density. Practically, if an adequately long segment of feather is folded and that segment retains the shape of a "V" or a tent, it is deemed perfectly suited for fly tying applications. A perfect "V" or tent shape is a configuration that all accomplished fly tiers strive for. This configuration, and its application, have been a component in the field of fly tying for significantly more than a century. As previously stated, this has only been accomplished previously through digital manipulation.

The process of folding feathers has been replete with associated problems. These problems result from the wide range of varying properties of feathers. Feathers on any given bird, in particular, and on all bird species, in general, vary in stiffness, flexibility, length, width, thickness, fragility, texture, strength, and curvature, among other things. The present invention is directed toward an economical device which will quickly perform the task of folding feathers, is relatively easy to use, and universally effective, for all such variations and individual feathers.

The previous method, which was limited to digital manipulation, has failed as a complete solution to this problem because many individuals lack the requisite dexterity to accomplish satisfactory feather folding results. This required dexterity may be developed by some individuals through repeated practice, but the necessary multi-digit involvement is extremely difficult for most people to master. Even among those who have mastered it and understand what needs to be done, the process is often accomplished only slowly, with great perseverance and will power. Digital manipulation for feather folding has been equated by some to a golf swing or juggling. Few people master it, and all others, particularly those who are less practiced, execute it in an inferior manner. Digital manipulation requires one end of the feather to be held by the fingers of one hand while the other end of the feather is held by the fingers of the other hand. The feather segment is then folded with the remaining free digits. As the free digits encounter the area to be folded, the quill tends to flex and twist about its axis. Barbs spring about their original positions, grip tensions change with lapses of concentration and other problems manifest and compound as the effort continues. For the novice fly tier, the difficulty becomes immediately realized and often proves exasperating.

Accordingly, a need exists for a feather folding device and method which will allow a person with ordinary dexterity to immediately, and successfully, fold a feather for fly tying purposes.

Such a need exists for a device which imparts a feather with a more accurate degree of fold than digital manipulation and which imparts a fold which has more permanence than previous digital manipulation, which, in turn, provides more uniform folds.

It would be further desirable to provide a device which is capable of folding feathers which are otherwise too difficult to fold by digital manipulation and which would reduce waste resulting from the discarding of expensive feathers.

It would further be desirable to provide a device which makes folding technique easily attainable by the novice and readily available to those who would otherwise be discouraged by the process.

It would further be desirable to provide a device which could significantly decrease production costs of some patterns of fishing flies.

SUMMARY OF THE INVENTION

The instant invention is directed to the provision of a feather folding device and method which will allow a person with ordinary dexterity to immediately, and successfully, fold a feather for fly tying purposes.

More specifically, the present invention is directed to provision of a feather folding device and method which will decrease production costs of some patterns of fishing flies, which will enable a novice to attain a folding technique which will fold feathers otherwise too difficult to be folded by most persons by digital manipulation, which will reduce waste, and which will provide a more accurate degree of fold and a fold with more permanence and uniformity than ordinarily possible through digital manipulation.

According to an important feature of the invention, the invention feather folding device includes one or more pairs of flexible, resilient members. Each individual member has a pliant face which is radially concave from its base to its extended end. Each of the two (2) members in a pair of members are approximately the same width and thickness. The pliant radially concave faces of each pair of members are superimposed against each other with the base being held together, which likewise forces the upper or outer ends of the radially concave dimension to contact each other. This configuration allows for a feather to be placed between the two (2) members and the pliant opposing faces of the two (2) members to be pressed together, uniformly, and permanently folding a feather. Such a configuration additionally holds the barbs of a feather in uniform position during the compressing, folding process.

According to a further feature of the invention, one resilient member which is smaller, or shorter than the other resilient member has a tapered top or outer end, with the taper extending uniformly along the entire width dimension of the top or outer end. This feature, in conjunction with the superimposition of the concave faces of each pair of members provides an outwardly disposed notch running along the entire width dimension of the pair of members, at the point where the top, or extended end of the smaller, or shorter member contacts the concave face of the larger, or longer member. This configuration additionally facilitates positioning of a feather quill lengthwise in the notch and predisposition of the barbs on each side of the quill to be folded in the same direction when the quill is inserted downward between the flexible members. This feature of the invention allows both of the user's hands to be utilized only for purposes of guiding the quill downward between the resilient members and does not require the user to utilize digital manipulation to initially bend or align the barbs in the desired direction.

According to a further feature of the invention, the pliant concave faces of each pair of members each have a durometer rating of between 60–80, with an optimal durometer rating of 70. This feature allows for optimal compression of the members against the quill and barbs, providing accurate, uniform and permanent folds.

According to a further feature of the invention, the feather folding device includes a base structure which performs the dual function of holding each pair of superimposed resilient members against each other at their base to maintain contact at both ends of the radial concavity of the members and which allows the device to sit upright, without being held by the user, allowing the user to have both hands free for purposes of guiding the quill, properly aligned, between the opposing superimposed members.

According to a further feature of the invention, the radial concavity of the opposing, superimposed pliant concave faces of the vertical members provides a space or aperture between the members, across their width. This feature of the invention allows the quill of the feather to be received between the resilient members while the pliant concave faces of the members remain in contact, holding the barbs of the feather in the desired position for folding. This feature of the invention may even be realized where such an aperture is not actually, or visibly, apparent because of the relative pliability of the opposing faces, because the concavity feature will, of necessity, provide for graduated lesser compression force at points between the base and outer ends of the radially concave members than at the base and outer points.

According to a further feature of the invention, each pair of resilient members may be comprised of rubber material, in a resilient sheet configuration.

According to a further feature of the invention, the invention may include a plurality of superimposed pairs of resilient members as described, with each superimposed pair having a defined degree of resilience distinct from the degree of resilience of each other pair of members and, in such instance, the base member may be configured correspondingly, to hold any number of such corresponding pairs in place. This feature allows the user to utilize one device, for feathers having different characteristics which impact the folding process.

According to a further feature of the invention, any one or more of the superimposed pairs of resilient members, as previously described, may be fabricated so that the resilient members are joined, as one piece, at their base ends with the separate resilient members protruding from the base end. A possible configuration utilizes one piece of rubber sheeting or other material folded together at its base, to provide two (2) separate upright members protruding therefrom, displaying the desired characteristics.

The above and additional features of the invention may be considered and will become apparent in conjunction with the drawings in particular, and the detailed description which follows.

BRIEF DESCRIPTION OF THE DRAWINGS

The following detailed description is best understood by reference to the following drawings, in which.

DETAILED DESCRIPTION OF THE PREFERRED EMBODIMENT

Figure 1:
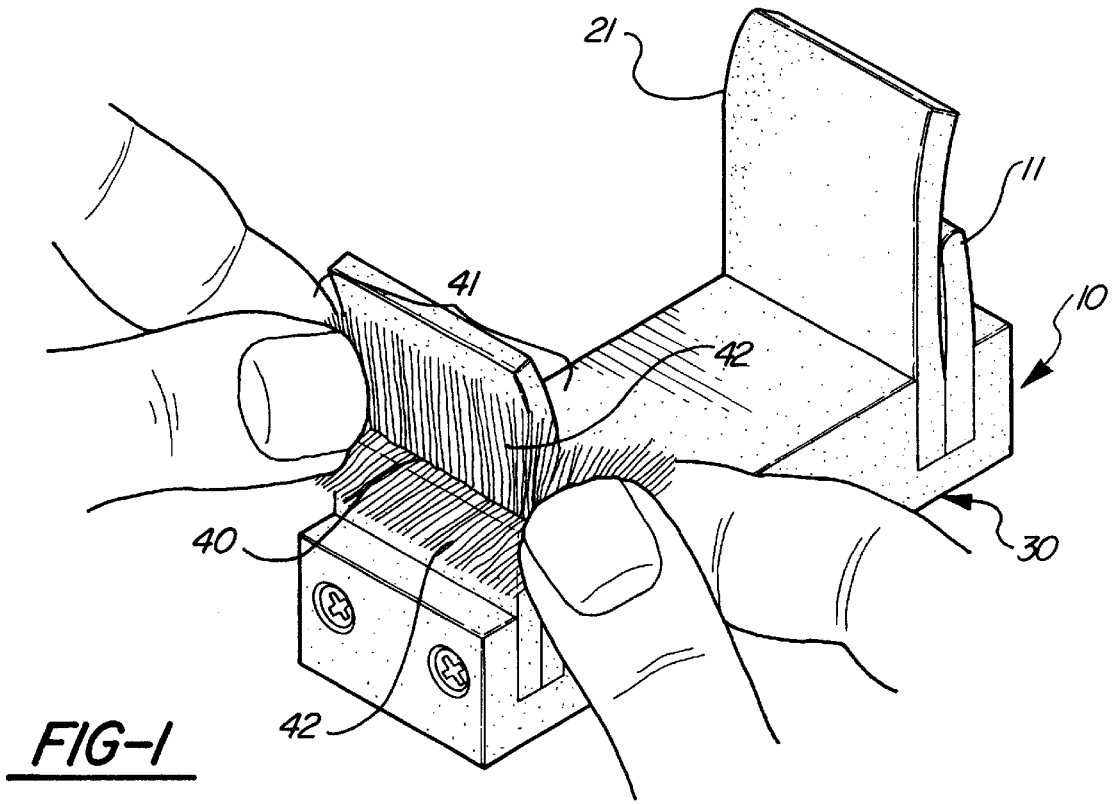
FIG. 1 is a perspective view of the device showing two (2) pairs of corresponding resilient members and a base with a feather positioned for insertion between one of the corresponding pairs of resilient members.

The invention feather folding device 10, broadly considered, includes a first resilient member 11 and a second resilient member 21.

The first resilient member 11 has a base end 12, an outer end 13 and two sides 14a and 14b. The sides 14a and 14b define a width dimension A. Member 11 additionally has a pliant face 15, which is radially concave between its base end 12 and its outer end 13.

The second resilient member 21 has a base end 22, an outer end 23, and two sides 24a and 24b. The sides 24a and 24b define a width dimension B. Member 21 additionally has a pliant face 25 which is radially concave between its base end 22 and its outer end 23. In the preferred embodiment width dimension A and width dimension B are substantially equal.

Figure 4:
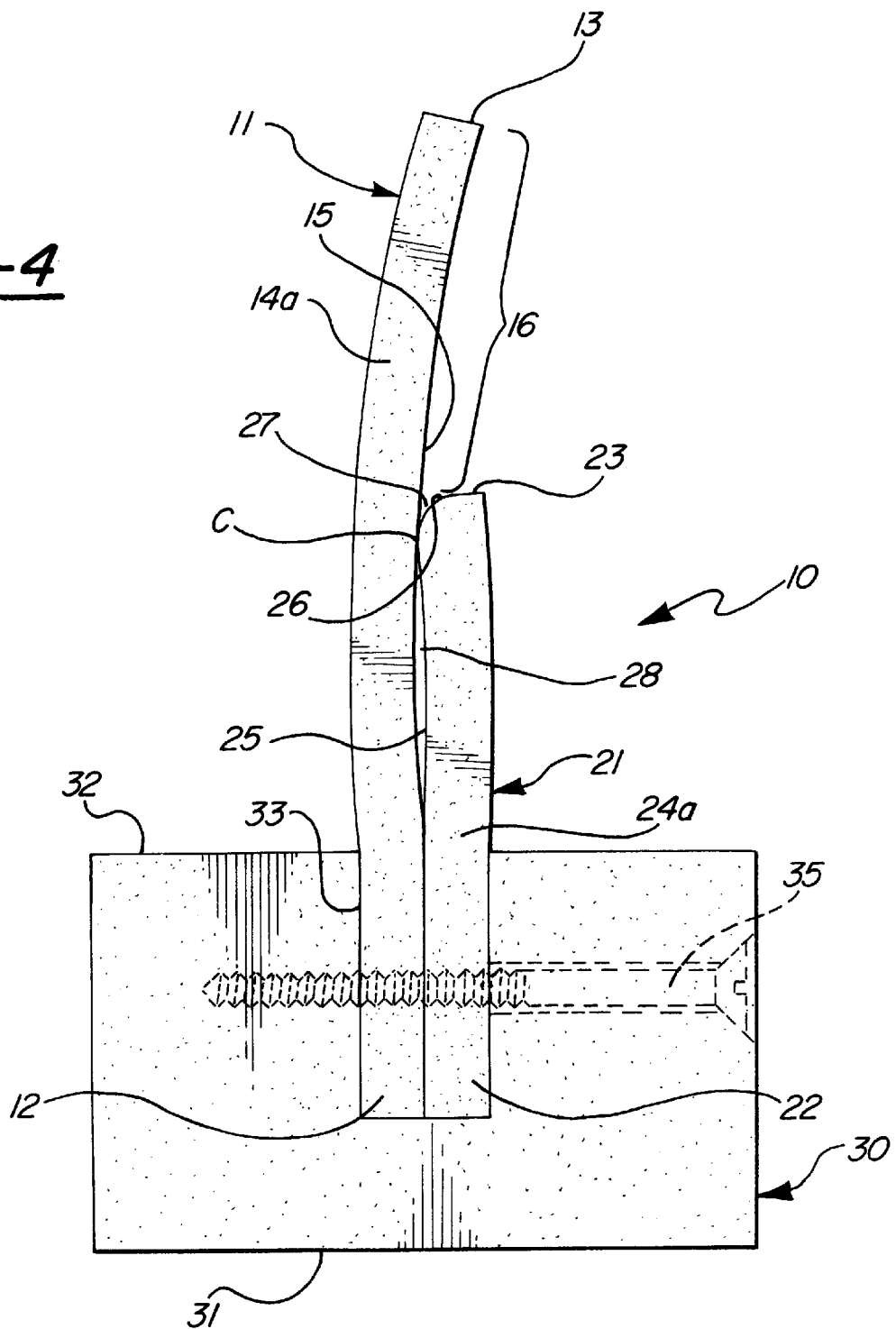
FIG. 4 is a side view of the device demonstrating the superimposition and radial concavity of the corresponding resilient members.

As shown particularly in FIG. 4, first resilient member 11 and second resilient member 21, in the preferred embodiment of the invention, are disposed in a superimposed relationship so that the pliant concave face 25 of the second resilient member 21 overlies a portion of the pliant concave face 15 of the first resilient member 11. In the preferred embodiment of the device 10, when member 11 and member 21 are in such superimposed relationship as shown in FIG. 4, at least a portion 16 of member 11 extends beyond the outer end 23 of member 21, while the base end 12 of member 11 is held against the base end 22 of member 21 in a fixed contact relationship along their respective width dimensions A and B. This fixed contact relationship, because of the radial concavity of face 15 and face 25, causes the outer end 23 of member 21 to contact the concave face 15 of member 11 at a point of contact C between the base end 12 and outer end 13 of member 11.

Figure 2:
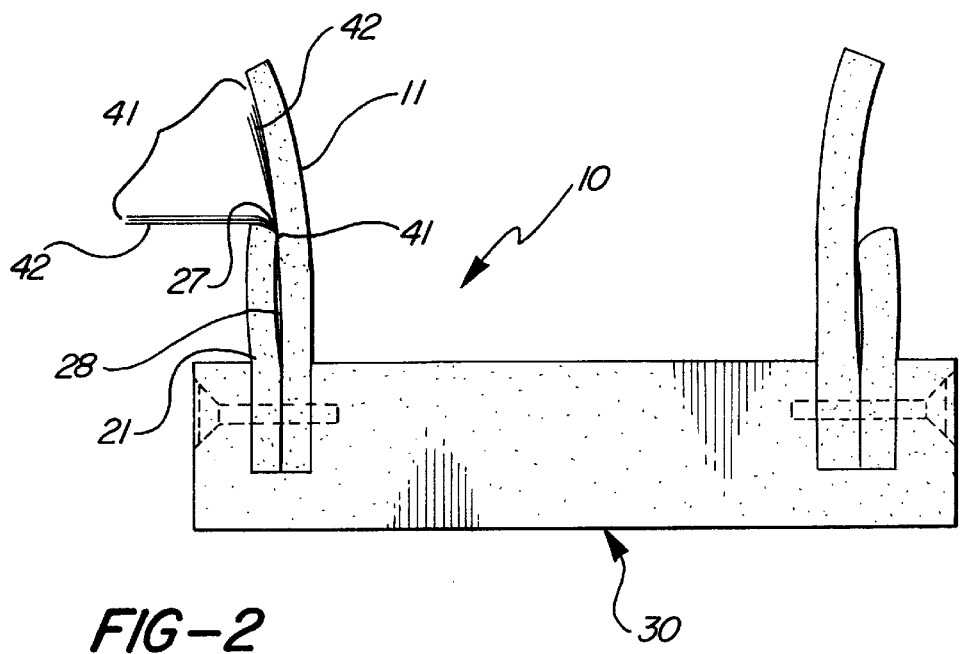
FIG. 2 is a side view of the device showing two (2) corresponding pairs of resilient members, with the barbs of a feather in position immediately prior to insertion of the quill of the feather between one pair of corresponding resilient members.

The outer end 23 of member 21 has a tapered surface 26 which tapered surface 26 extends along the entire width dimension B of member 21. The interface of the tapered surface 26 of the outer end 23 of member 21 and the concave face 15 of member 11 at point of contact C defines a slot 27 which runs through point of contact C along the entire respective width dimensions A and B of members 11 and 21. Slot 27 is outwardly disposed to accept a feather quill 40 as shown in FIGS. 1 and 2.

In the preferred embodiment of the device 10, the disposition of the concave face 15 of member 11 and the concave face 25 of member 21, wherein member 11 and member 21 are held against each other at their base ends 12 and 22 and the outer end 23 of member 21 contacts the concave face 15 of member 11 across width dimensions A and B running through point of contact C, creates and defines an aperture or opening 28 between member 11 and member 21 running along their respective width dimensions A and B and located between point of contact C, of outer end 23 and concave face 15, and base ends 12 and 22.

The device further includes a base member 30. Base member 30 has a bottom surface 31, which is generally planar, and an upper surface 32, which defines a slot 33. The slot 33 is configured to received the base ends 12 and 22 of members 11 and 21 and hold them in contact with each other in a superimposed face 15 to face 25 relationship as shown in FIG. 4.

In the preferred embodiment, as a means of securing the base end 12 of member 11 to the base end 22 of member 21, base member 30 and members 11 and 21 are perforated, with the perforations 34a, 34b and 34c, respectively, aligned. A screw member 35 is inserted through each alignment of perforations 34a, 34b and 34c, holding the base ends 12 and 22 together within slot 33, and fixing the superimposed relationship of the concave faces 15 and 25 of resilient members 11 and 21, respectively.

In the preferred embodiment, the superimposition of the resilient member 11 and 21 may be accomplished by configuration of the slot 33, by the screw members 35 themselves, by compression of the opposing sides 33a and 33b of the slot 33, or by any combination thereof. Alternative means such as adhesives may also be used.

In the preferred embodiment the resilient members 11 and 21 are fabricated from sheet rubber material. However, other material addressing the requirements for resiliency of members 11 and 21 and pliancy of the radially concave faces 15 and 25 may be substituted. A key feature of the invention 10 is the pliant nature of concave face 15 and concave face 25. The optimum durometer rating for these elements 15 and 25 is 70 and, in the preferred embodiment, the durometer reading will be within a range of 60–80, although the invention 10 is functional at durometer rating outside of the stated range.

Figure 3:
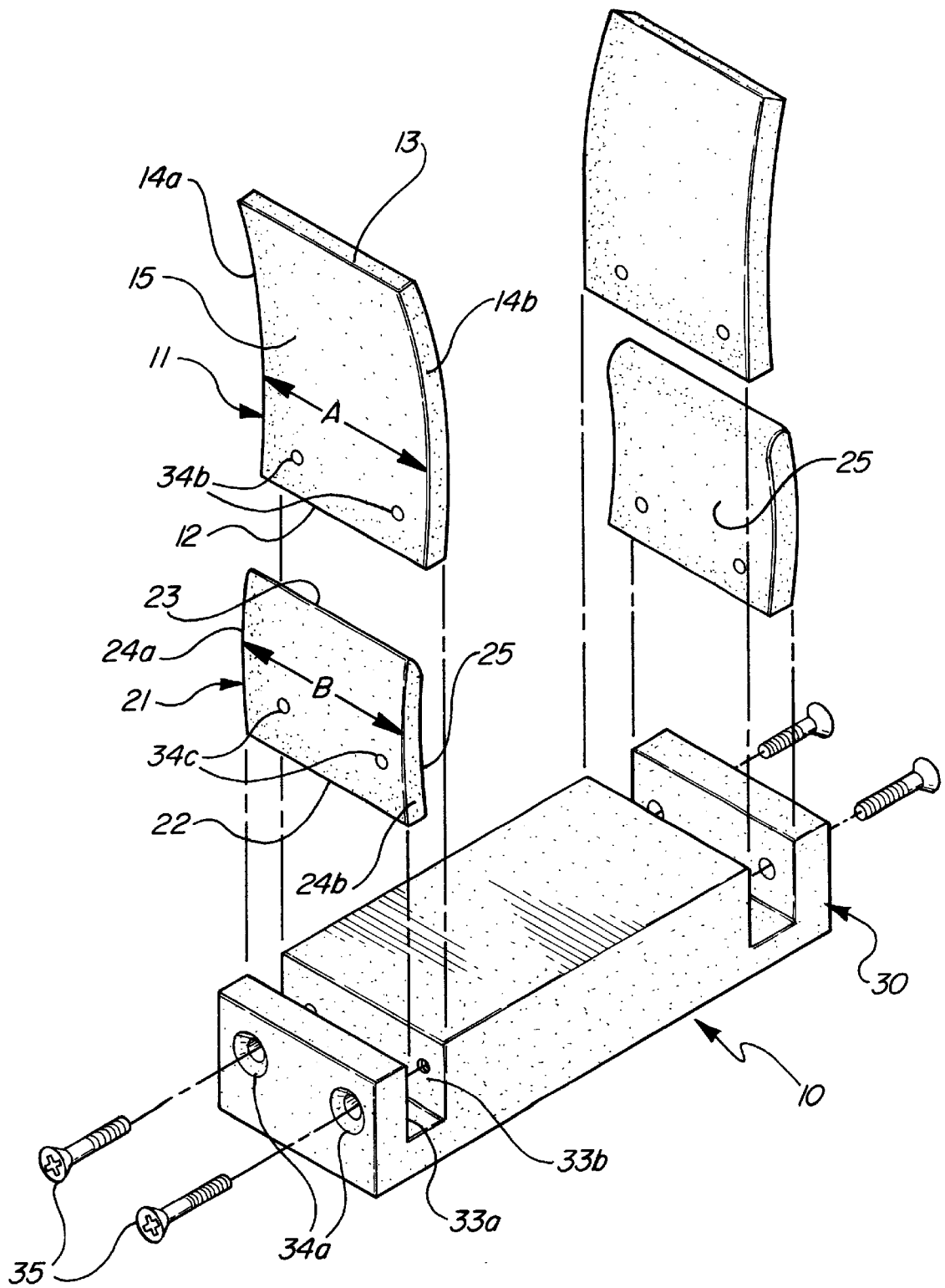
FIG. 3 is an exploded view of the device showing the component parts thereof.

In the preferred embodiment, as shown in FIGS. 1–3, the device 10 will include a series or plurality of the superimposed pairs of resilient member 11 and resilient member 21 shown in FIG. 4. In this embodiment, each superimposed pair of members 11 and 21 will have a defined degree of resilience which is separate and distinct from all other pairs of members 11 and 21 which may be provided. If desired, the durometer rating of the concave faces 15 and 25 for each pair of members 11 and 21 may also vary. The provision of multiple pairs of separate and distinct members 11 and 21, allows one unit of the invention 10 to be utilized in varying applications.

In its preferred embodiment, the feather folding device 10 is utilized to fold a feather 41 by holding the feather at both ends by its centered quill as shown in FIG. 1. The quill is held parallel to width dimensions A and B of resilient members 11 and 21 with its barbs 42, which extend from the quill 40 in two directions disposed approximately 180° from each other, aligned so that one set of barbs 42 corresponds to the outer ends 13 and 23 of members 11 and 21 and the opposite set of barbs 42 corresponds to the base ends 12 and 22 of members 11 and 21. The quill 40 is pushed toward the device 10 so that the quill 40 passes in close proximity over the outer end 23 of the second resilient member 21 and lodges in the slot 27 with the quill 40 substantially parallel with width dimensions A and B. The quill 40 is then inserted, parallel to said width dimensions A and B, between the first resilient member 11 and the second resilient member 21, directing the quill 40 toward the base 30, until the quill 40 lodges in opening 28. The members 11 and 21 move apart to allow passage of the quill 40 but return to position to force the barbs 42 on both sides of the quill 40 in a uniform direction opposite the direction in which the quill 40 is being inserted, so that the barbs 42 are disposed toward the outer ends 13 and 23 of members 11 and 21.

The resilient members 11 and 21 are then pressed together so that the pliant concave faces 15 and 25 press the normally opposing barbs 42 of the feather 41 together, permanently folding the barbs 42 in a uniform direction from the quill. The resilient members 11 and 21 are then pushed apart, and the folded feather 41 removed from the device 10.

Figure 5:
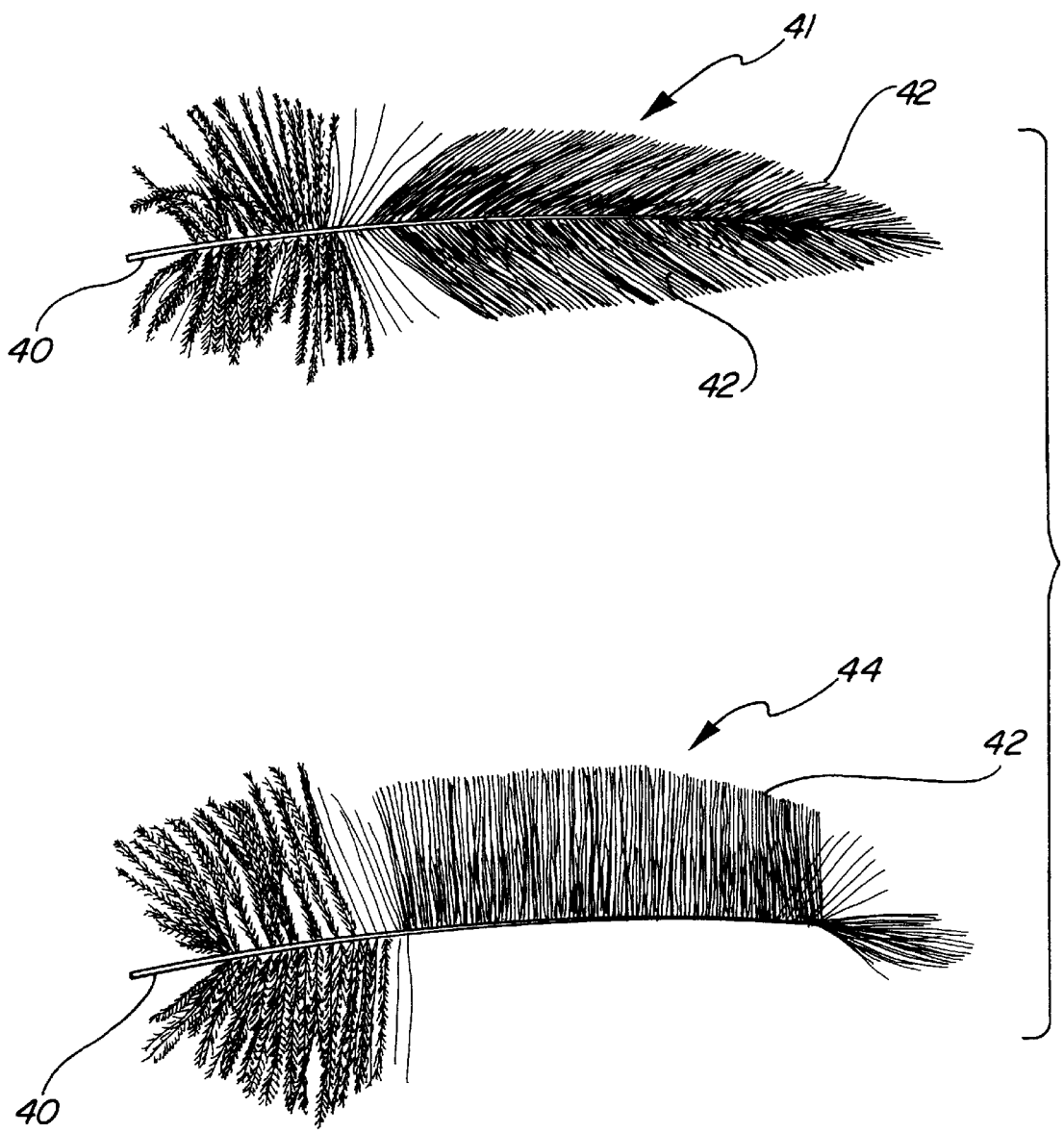
FIG. 5 is a perspective view of a feather prior to and after folding.

A folded feather 44 is shown in FIG. 5.

WHEREAS, a preferred embodiment of the invention has been illustrated and described in detail, it will be apparent that various changes may be made in the disclosed embodiment without departing from the spirit of the invention.

What is claimed is:

1. A feather folding device comprising:

a first resilient member;

a second resilient member;

said first member and second member each having a pliant radially concave face; and said first member and second member being disposed in a superimposed relationship so that the pliant concave face of the second member overlies at least a portion of the pliant concave face of the first member; and said first resilient member and second resilient member each further comprise a base end, and outer end and a pair of sides defining a width dimension, with the radial concavity of each of said resilient members being between their respective base ends and outer ends; and a means for holding the base ends of the first resilient member and the second resilient member against each other in a fixed contact relationship along their respective width dimensions so that a portion of the outer end of the second resilient member contacts the first resilient member along their respective width dimensions at a point of contact between the base end and the outer end of said first resilient member; and the outer end of said second resilient member is tapered along its width dimension so that the concave face of the first resilient member and the outer end of the second resilient member define an outwardly disposed notch along the contact interface of their respective width dimensions.

2. A feather folding device comprising:

a first resilient member;

a second resilient member;

said first member and second member each having a pliant radially concave face and said first member and second member being disposed in a superimposed relationship so that the pliant concave face of the second member overlies at least a portion of the pliant concave face of the first member; and said first resilient member and second resilient member each further comprise a base end, and outer end and a pair of sides defining a width dimension, with the radial concavity of each of said resilient members being between their respective base ends and outer ends; and a means for holding the base ends of the first resilient member and the second resilient member against each other in a fixed contact relationship along their respective width dimensions so that a portion of the outer end of the second resilient member contacts the first resilient member along their respective width dimensions at a point of contact between the base end and the outer end of said first resilient member; and said means of holding said base ends together comprises a base support member having a planar bottom surface and an upper surface defining a slot configured to receive said base ends in said superimposed position.

3. The device of claim 2, further comprising a plurality of superimposed pairs of first resilient members and second resilient members, each of said superimposed pairs having a defined and distinct degree of resilience, and said base member having a corresponding plurality of slots each configured to receive the base ends of its corresponding pair of first and second resilient members.

4. A feather folding device comprising:

a first resilient member;

a second resilient member;

said first member and second member each having a base end, an outer end, a pair of sides defining a width dimension, and a pliant face, radially concave between said base end and outer end;

said first member and second member being disposed in a superimposed relationship so that the concave face of the first member and the concave face of the second member are connected at their respective base ends in a face to face contact relationship, the pair of sides of said first member and second member generally correspond and said second member overlies a significant portion of said first member, with a portion of the outer end of the second resilient member contacting the concave face of the first resilient member along their respective width dimensions at a point of contact between the base end and outer end of said first member;

said outer end of the second resilient member being tapered along its width dimension so that the concave face of the first resilient member and the tapered outer end of the second resilient member define an outwardly disposed notch along the contact interface of their respective width dimensions; and a base support member comprising:

a planar bottom surface; and an upper surface defining a slot configured to receive the base ends of the first resilient member and second resilient member in said superimposed relationship.

5. The device of claim 4, wherein the disposition of the concave faces of the first resilient member and second resilient member defines an aperture between said members along their respective width dimensions between their respective base ends and outer ends.

6. The device of claim 4, wherein the first resilient member and second resilient member are comprised of sheet rubber material.

7. The device of claim 4, wherein said pliant concave faces each have a durometer rating of 60–80.

8. The device of claim 4, wherein said pliant concave faces each have a durometer rating of approximately 70.

9. The device of claim 4, further comprising a plurality of superimposed pairs of first resilient member and second resilient members;

each of said superimposed pairs of first and second resilient members having a defined and distinct degree of resilience; and said base member further defining a corresponding plurality of slots, each configured to receive the base ends of its corresponding pair of superimposed first and second resilient members.

10. The device of claim 4, wherein said resilient members, at their base ends, are formed from the same continuous unit of material.

11. A method of folding a feather for fly-tying purposes so that the barbs of both sides of the feather are permanently folded in one direction from the feather's quill, said method including the steps of:

A. providing a feather folding device comprising:

a first resilient member and a second resilient member, each having a base end, an outer end, and a pair of sides defining a width dimension, and a pliant, concave face, radially concave between said base end and outer end;

said first and second members being disposed in a superimposed relationship so that the concave face of the first member and the concave face of the second member are held together at their respective base ends in a face to face relationship, the pair of sides of each of said first and second member generally corresponding, and said second member overlying a significant portion of said first member with a portion of the outer end the second resilient member contacting the concave face of the first resilient member along their respective width dimensions at a point of contact between the base end and the outer end of said first member; and said outer end of the second resilient member being tapered along its width dimension so that the concave face of the first resilient member and the tapered outer end of the second resilient member define an outwardly disposed notch along the contact interface of the respective width dimensions;

B. holding the feather to be folded by its quill, so that the quill is parallel to the width dimension of the resilient members, and the barbs on one side of the feather correspond to the base end and the barbs on the other side of the feature correspond to the outer end of the resilient members, and pushing the feather toward the device so that the quill passes over the outer end of the second resilient member in close proximity and lodges in the slot formed along the top point of contact between the outer edge of the first resilient member and the concave face of the second resilient member;

C. inserting the quill between the first resilient member and second resilient member, forcing said members apart and directing the quill toward the base ends of said members, resulting in said resilient members forcing the barbs on both sides of the feather to be disposed toward the outer ends of said members;

D. compressing said resilient members together so that the pliant concave faces of the first resilient member and second resilient compress the barbs of the feather together, permanently folding them in one direction from the quill; and E. pushing the resilient first member and resilient second member apart and removing the folded feather from the device upon completion of the folding process.

12. The method of claim 11, wherein, the device provided in step A further comprises disposition of the concave faces of the first resilient member and second resilient member so as to define an aperture between said members along their respective width dimensions between their respective base ends and outer ends; and insertion of the quill between the first resilient member and second resilient member, as provided in step C, continues until said quill is lodged within said aperture.

* * * * *